United States Patent [19]

Asano et al.

[11] Patent Number: 4,537,824
[45] Date of Patent: Aug. 27, 1985

[54] MAGNETIC RECORDING MEDIUM

[75] Inventors: Masao Asano; Wataru Fujimatsu; Kazumasa Matsumoto; Hideki Murata; Toshihiko Sato; Kenji Watanabe, all of Hino, Japan

[73] Assignee: Konishiroku Photo Industry Co., Ltd., Tokyo, Japan

[21] Appl. No.: 588,084

[22] Filed: Mar. 9, 1984

[30] Foreign Application Priority Data

Mar. 11, 1983 [JP] Japan ................................. 58-40087

[51] Int. Cl.$^3$ ........................... G11B 5/72; G11B 5/70
[52] U.S. Cl. .................................. 428/323; 252/62.54;
360/134; 360/135; 360/136; 427/128; 427/131;
427/132; 428/425.9; 428/425.8; 428/694;
428/695; 428/704; 428/900; 428/337
[58] Field of Search ............ 428/695, 694, 900, 425.9,
428/425.8, 323, 337, 704; 427/128, 131, 132;
252/62.54; 360/134–136

[56] References Cited

U.S. PATENT DOCUMENTS

| | | | |
|---|---|---|---|
| 3,398,011 | 8/1968 | Neirotti | 427/130 |
| 3,852,314 | 12/1974 | Hamanaka | 526/329.7 |
| 4,107,385 | 8/1978 | Higuchi | 428/695 |
| 4,439,486 | 3/1984 | Yamada | 428/900 |
| 4,465,608 | 8/1984 | Gerüm | 427/128 |

*Primary Examiner*—Ellis P. Robinson
*Attorney, Agent, or Firm*—Jordan B. Bierman

[57] ABSTRACT

A magnetic recording medium is described comprising a non-magnetic support layer, a magnetic layer and at least one layer of a high-molecular weight boron containing compound of the formula:

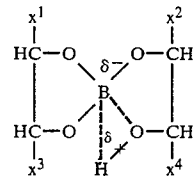

12 Claims, 5 Drawing Figures

MAGNETIC RECORDING MEDIUM

BACKGROUND OF THE INVENTION

1. Field of the Invention

The present invention relates to an improvement of a magnetic recording medium, and more particularly to a magnetic recording medium which is excellent in the lubricity and wear resistance.

2. Description of the Prior Art

A magnetic recording medium comprises a support such as of polyethylene terephthalate, polyethylene-2,6-naphthalate, or the like, having directly or through a subbing layer thereon a magnetic layer containing ferromagnetic powdery material, and further having, if necessary, on the magnetic layer thereof and/or on the back of the support thereof an overcoat layer and/or backcoat layer, respectively. In the recording or reproduction of information, the magnetic recording medium is scanned with being rubbed by a magnetic head. Further the relative speed between the recording medium and the recording head is very high (e.g., from 19 to 38 cm/sec.) and, besides, during the record reproduction, the recording head vigorously rubs the running recording medium, so that the wear resistance and life of the recording medium, when repeatedly used, come into question.

In order to cope with such problems, for example, as is described in Japanese Patent Publication Open to Public Inspection (hereinafter referred to as Japanese Patent O.P.I. Publication) No. 39402/1974, a magnetic recording medium treated over the magnetic layer surface thereof with a lubricant such as graphite, molybdenum dioxide, castor oil, olive oil, or the like, may be used, but these treatments are not considered to provide as much sufficient lubricity as to withstand the use over an extensive period of time.

In order to overcome the shortcoming of such techniques of the prior art, Japanese Patent O.P.I. Publication No.39402/1974 proposes coating over a nonmagnetic support a mixture of a boron compound with a binder, in a proportion of 1.0–1.5 parts by weight of the compound to 100 parts by weight of the binder, along with a ferromagnetic powdery material, the said compound having the formula:

However, the above compound is a low-molecular compound and is one mixed as an additive into a binder, so that if the compound is added in a quantity exceeding a given limit to raise its lubricating effect, the effect becomes saturated, and on the contrary it increases the "blooming phenomenon," thus causing it to become eventually unable to be used because of its undesirable phenomenon.

OBJECT OF THE INVENTION

It is therefore an object of the present invention to provide a magnetic recording medium which is free of such the disadvantage as in magnetic recording media of the prior art and which is excellent in the wear resistance and lubricity.

CONSTRUCTION OF THE INVENTION

The above object of the present invention is attained by providing at least one layer containing a high-molecular compound having a boron-containing unit on a magnetic recording medium comprising a support having thereon a ferromagnetic powdery material-containing magnetic layer, the said unit being a monovalent or divalent radical having the formula:

Formula (I)

wherein at least one of the $x^1$, $x^2$, $x^3$ and $x^4$ has a linkage —O—R— through an oxygen atom with a polymer chain, wherein the R is a divalent hydrocarbon residue.

Figure 1:
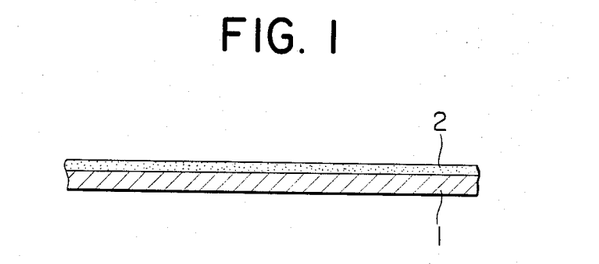
FIGS. 1, 2, 3 and 4 are partially cross-sectional views of typical layer constructions of examples of the magnetic recording medium of the present invention, wherein 1 is support, 2 is magnetic layer, 3 is overcoat layer, 4 is subbing layer and 5 is backcoat layer.
Figure 2:
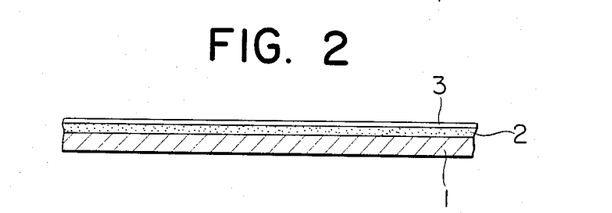
Figure 3:
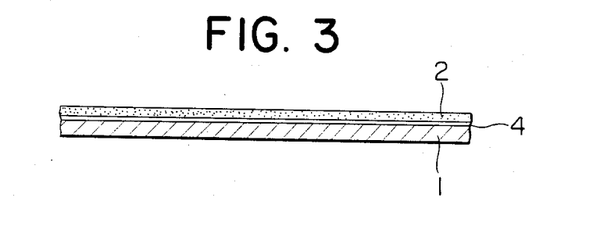
Figure 4:
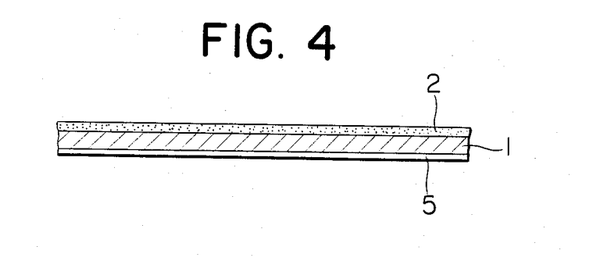

The layer containing a high-molecular compound having a boron compound-containing unit having Formula (I) constitutes at least one of magnetic layer 2, overcoat layer 3, subbing layer 4 and backcoat layer 5 in a magnetic recording medium such as one comprising support 1 forming directly thereon a magnetic layer 2 as shown in FIG. 1; one forming an overcoat layer 3 over the magnetic layer 2 of the magnetic recording medium of the construction of FIG. 1 as shown in FIG. 2; one forming a magnetic layer 2 through a subbing layer 4 on support 1 as shown in FIG. 3; or one having on the back of support 1, i.e., on its side opposite to the side of the magnetic layer formed thereon, a backcoat layer 5.

The thus used high-molecular compound for the magnetic recording medium of the present invention is allowed to be one having a boron-containing unit having Formula (I) in the principal chain or the side chain thereof or at the terminal of the princial chain or the side chain thereof or pendent from the principal chain or the side chain thereof.

The following are examples of those boron-containing units having Formula (I):

(1) Boron-containing unit derived from glycerol borate-laurate.

(2) Boron-containing unit derived from glycerol borate-palmitate.

(3) Boron-containing unit derived from glycerol borate-stearate.

(4) Boron-containing unit derived from glycerol borate-oleate.

(5) Boron-containing unit derived from glycerol borate-iso-octadecanoate.

(6) Boron-containing unit derived from glycerol borate-hydroxystearate.

(7) Boron-containing unit drived from polyoxyethyleneglycerol borate-laurate.

(8) Boron-containing unit derived from polyoxyethyleneglycerol borate-palmitate.

(9) Boron-containing unit derived from polyoxyethyleneglycerol borate-stearate.

(10) Boron-containing unit derived from polyoxyethyleneglycerol borate-oleate.

(11) Boron-containing unit derived from polyoxyethyleneglycerol isooctadecanoate.

(12) Boron-containing unit derived from glycerol borate-benzoate.

(13) Boron-containing unit derived from glycerol borate-cinnamoate.

(14) Boron-containing unit derived from glycerol borate-isostearate.

A process for the production of a boron-containing unit having Formula (I) will be illustrated, taking polyurethane as an example. For convenience's sake, the illustration will be made for the case where as the raw material for producing a boron-containing unit there is used a compound having Formula (II) or (III):

Formula (II)

wherein R is an alkylene radical having 2 to 4 carbon atoms, X is a hydrogen atom or an acyl radical having from 8 to 22 carbon atoms, and l and m each is an integer of from 0 to 20. In Formula (II), the alkylene radical having from 2 to 4 carbon atoms represented by the R includes, e.g., ethylene, propylene, and butylene radicals and those isomers of these alkylene radicals, and the acyl radical having from 8 to 22 carbon atoms represented by the X includes, e.g., octanoyl, nonanoyl, decanoyl, undecyloyl, lauroyl, tridecyloyl, myristoyl, pentadecyloyl, palmitoyl, margaroyl, stearoyl, isostearoyl, hydroxystearoyl, oleoyl, behenoyl, and the like radicals.

Those compounds having Formula (II) include polyoxyethyleneglycerol borate (wherein polyoxythylene is a radical represented by $-(C_2H_4O)_i$ wherein i is equal to the foregoing l or m), glycerol borate-laurate, glycerol borate-palmitate, glycerol borate-stearate, glycerol borate-oleate, glycerol borate-isostearate, glycerol borate-hydroxystearate, polyoxyethyleneglycerol borate-laurate, polyoxyethyleneglycerol borate-palmitate, polyoxyethyleneglycerol borate-stearate, polyoxyethyleneglycerol borate-oleate, polyoxyethyleneglycerol borate-isostearate, polyoxyethyleneoxypropyleneglycerol borate-laurate, polyoxyethyleneoxypropyleneglycerol borate-palmitate, polyoxyethyleneoxypropyleneglycerol borate-stearate, polyoxypropyleneglycerol borate-laurate, polyoxypropyleneglycerol borate-palmitate, polyoxypropyleneglycerol borate-stearate, polyoxypropyleneglycerol borate-isostearate, polyoxypropyleneglycerol borate-oleate, and the like.

In the compound having Formula (II), the addition number (l+m) of the alkyleneoxide of from 0 to 30 is desirable in respect of the characteristics of the magnetic recording medium of the present invention, to which is applied as, e.g., a binder the high-molecular compound containing a unit having Formula (I).

These glycerol borates having Formula (II) may be used either alone or in a mixture in combination of not less than two thereof, or in a mixture thereof with a diacyl ester having the formula:

Formula (III)

wherein R is an alkylene radical as defined in Formula (II), X is an acyl radical as defined in Formula (II), and l and m are also as defined in Formula (II).

Those exemplifiable compounds of Formula (III) are diacylated ones similar to the foregoing exemplified compounds of Formula (II).

A glycerol borate having Formula (II) or (III) reacts with an organic isocyanate during the formation of a polyurethane, and chemically combined with the produced polyurethane resin (called merely polyurethane or urethane). Consequently the borate will not surface nor move, so that its effect can be retained over a long period of time. The preferred quantity of the borate to any of the units derived from the following active hydrogen-containing compounds is from 5% by weight to the quantity equal to that of the unit. If the quantity is not more than 5% by weight, the effect of using the high-molecular compound of the present invention for the magnetic recording medium is not sufficient, while if the quantity exceeds the range, then the physical property of, e.g., the polyurethane resin as the binder in the magnetic recording medium becomes worse, whereby the characteristics of the medium tends to become deteriorated.

Those active hydrogen-containing compounds for use in producing the polyurethane in the present invention include, e.g., such compounds as ethylene glycol, diethylene glycol, propylene glycol, 1,4-butylene glycol, bisphenol A, glycerol, 1,3,6-hexane triol, trimethylol propane, pentaerythritol, sorbitol, sucrose, dipropylene glycol methyldiethanolamine, ethyldiisopropanolamine, triethanolamine, ethylenediamine, hexamethylenediamine, bis(p-aminocyclohexane), tolylenediamine, diphenylmethanediamine, methylenebis(2-chloroaniline), and the like, and such polyether polyols as obtained by the addition to these compounds of one or not less than two of ethyleneoxide, propyleneoxide, butyleneoxide, tetrahydrofuran, styrene oxide, and the like (hereinafter merely called alkyleneoxide). As the foregoing active hydrogen-containing compound, there may also be used polyester polyols such as, e.g., ethylene glycol, diethylene glycol, propylene glycol, dipropylene glycol, trimethylene glycol, 1,3- or 1,4-butylene glycol, neopentyl glycol, 1,6-hexamethylene glycol, decamethylene glycol, bisphenol A, bisphenol F, p-xylylene glycol, 1,4-cyclohexanediol, 1,4-cyclohexanedimethanol, glycerol, trimethylol propane, hexane triol, pentaerythritol, and the like; polyester polyols obtained by the reaction of one or not less than two of these alkyleneoxide addition products with one or not less than two of such acids as malonic acid, maleic acid, succinic acid, adipic acid, glutaric acid, pimelic acid, sebacic acid, oxalic acid, phthalic acid, isophthalic acid, terephthalic acid, hexahydrophthalic acid, and the like; polyols obtained by the ring-opening polymerization of cyclic esters such as propiolactone, butyrolactone, caprolactone, and the like; and such polyester polyols as obtained from the above polyols and cyclic esters and from the above polyols, dibasic acids and cyclic esters; and further, different active hydrogen-containing compounds including those obtained from polycarbonate polyoleates having the formula: e.g., $H+O—R—OCO+_nROH$ wherein n is an integer of $n \geq 1$, and R is a polyol or the residue of a polyhydric phenol, the said polyol or polyhydric phenol including, e.g., trimethylene glycol, diethylene glycol, 1,3- or 1,4-butylene glycol, 1,6-hexamethylene glycol, decamethylene glycol, p-xylylene glycol, bisphenol A[2,2-bis(4'-hydroxyphenyl)propane], bisphenol F(4,4'-dihydroxydiphenylmethane), and the like.

As the high-molecular polyol (A) for use in producing polyurethane in the present invention, there may also be used 1,2-polybutadiene polyol, 1,4-polybutadiene polyol, polychloroprene polyol, butadiene-acrylonitrile copolymer polyol, polydimethylsiloxane carbinol, and the like.

In addition to the above, such hydroxyl-containing higher fatty acid esters as castor oil, dehydrated castor oil, and the like, or polytetramethylene ether glycol may also be used.

Further, there may also be used such polymer polyols as obtained by the graft polymerization of such ethylenically unsaturated compounds as acrylonitrile, styrene, methyl methacrylate, and the like, upon the foregoing polyether polyols or polyester polyols.

These active hydrogen-containing compounds may be used alone or in a mixture of not less then two thereof.

The organic isocyanate (B) for use in producing the polyurethane compound of the present invention includes, e.g., tolylene diisocyanate (including those in various proportions of isomers)(TDI), diphenylmethane-4,4'-diisocyanate (MDI), naphthylene-1,5-diisocyanate (NDI), 3,3'-dimethyl-4,4'-biphenylene diisocyanate (TODI), xylylene diisocyanate (XDI), dicyclohexylmethane-4,4'-diisocyanate (hydrogenated MDI), crude TDI, polymethylene-polyphenyl isocyanate (crude MDI), isophorone diisocyanate (IPDI), hexamethylene diisocyanate (HDI), hydrogenated xylylene diisocyanate (HXDI), and the like; and those isocyanuratedly modified products, carbodiimidatedly modified products, and biuret reagent-modified products of these isocyanates.

These various organic diisocyanates may be used alone or in a mixture of not less than two thereof.

The using quantity of any of the organic isocyanates should be arranged so that the NCO (isocyanate) radical contained in the organic polyisocyanate is in an equivalent ratio of 0.8–1.2, and more preferably 0.85–1.1 to the total active hydrogen content of the active hydrogen-containing compound and glycerol borate. If the quantity is outside the range, then the foregoing polyurethane resin, even though applied to the magnetic recording medium of the present invention, may be unable to cause the medium to display its characteristics satisfactorily.

In producing the polyurethane of the present invention there may, if necessary, be used those solvents including such amide-type solvents as dimethyl formaide, dimethyl acetamide, etc.; such sulfoxide-type solvents as dimethyl sulfoxide; such cyclic ether-type solvents as dioxane, tetrahydrofuran, etc.; such cyclic ketone-type solvents as cyclohexanone; such noncyclic ketone-type solvents as acetone, methyl-ethyl ketone, methyl-isobutyl ketone, etc.; such glycol ether-type solvents known as "Cellosolve," "Butyl Cellosolve," "Carbitol," "Butyl Carbitol," etc.; such glycol ether acetate-type solvents as known under the trade names "Cellosolve Acetate," "Butyl Cellosolve Acetate," "Carbitol Acetate," "Butyl-Carbitol Acetate," etc.; one or not less than two of such dibasic acid ester-type solvents known as, e.g., under the trade name "Diglime"; such ester-type solvents as the above solvents with ethyl acetate, butyl acetate, etc.; such aromatic hydrocarbon-type solvents as benzene, toluene, xylene, etc.; such chlorine-type solvents as methylene chloride, trichloroethylene, trichloroethane, perchloroethylene, etc.; such mixture solvents with alcohol-type solvents as methanol, ethanol, isopropanol, butanol, etc.; and the like. And 2,2,4-trimethyl-1,3-pentanediolmonoisobutyrate (Kyowanol M, a product of Kyowa Hakko Kogyo, Co., Ltd.) and the like may also be used as a solvent.

The polyurethane of the present invention may be produced in the following manner: The reaction of, e.g., a high-molecular polyol with an organic isocyanate in a nitrogen atmosphere first takes place by heating to a temperature of from 60° C. to 100° C. for several hours, if necessary, in the presence of a catalyst and/or a solvent to thereby produce a prepolymer. To this prepolymer is then added, e.g., a glycerol borate to further a several-hour reaction by heating at the same temperature to thereby produce a polyurethane resin. If necessary, a reaction stop agent may be added to the heating reaction system to thereby stop the reaction. The solvent may be replenished at arbitrary stages of the reaction to lower the viscosity. The thus obtained polyurethane resin solution (X) of the present invention contains 15 to 60% solid and has its viscosity of 200 to 70,000 cps at 25° C.

Alternatively, one or more of polyols of the prior art for use in producing polyurethane resins are used to react with an organic polyisocyanate in the manner as described in, e.g., Japanese Patent O.P.I. Publication No. 127616/1981 or in known manner to thereby prepare a known polyurethane resin (Y), which is then mixed with the above polyurethane resin solution (X), whereby a polyurethane resin mixture for the present invention can be obtained. The polyurethane resin and the resin mixture therewith can be diversified by changing the foregoing raw material and the mixing proportion of (X) to (Y). From the foregoing polyurethane resin solution or from the mixture therewith may be removed the solvent to thereby change it into solid (rubbery or waxy) form.

The foregoing polyurethane resin solution, the mixture, the concentrated product thereof, or the solid can be used for the magnetic recording medium.

In producing these polyurethane resins there may, if necessary, be used a reaction stop agent containing at least one active hydrogen atom. The reaction stop agent usable in the present invention includes such monoalcohols as isopropanol, n-butanol, sec-butanol, t-butanol, etc.; such glycols as ethylene glycol, propylene glycol, etc.; such triols as glycerol, trimethylol propane, etc.; such amines as dimethylamine, ethylpropylamine, dibutylamine, etc.; such alkanolamines as diethanolamine, triethanolamine, etc.; such oximes as acetoxime, methyl-ethyl ketoxime, etc.; such lactams as γ-butyrolactam, ε-caprolactam, etc.; such silane coupling agents as N-β-

(aminoethyl)-γ-aminopropyl-trimethoxysilane, N-β-(aminoethyl)-γ-aminopropyl-triethoxysilane, γ-aminopropyl-triethoxysilane, γ-mercaptopropyl-trimethoxysilane, etc.; and the like. The using quantity of these reaction stop agents is from 0.01 to 0.2 mole per mole of the organic isocyanate (B).

Further, as a modification of the polyurethane resin of the present invention, a two-liquid-hardening-type polyurethane resin may be used. When using this for producing the magnetic recording medium, the prepolymer process or the oneshot process may be used.

An example of the prepolymer process is as follows: The reaction of an organic isocyanate with part of an active hydrogen-containing compound and with a glycerol borate is effected for several hours by heating to a temperature of from 60° C. to 100° C. in the presence of or absent from a catalyst to thereby produce a prepolymer. The resulting prepolymer-containing liquid itself is also allowed to be changed into a magnetic coating liquid as hereinafter described. On the other hand, the other part of the above active hydrogen-containing compound and, if necessary, various additives are mixed to prepare a hardening agent. The prepolymer of the hardening agent is allowed to be diluted by an appropriate solvent. The prepolymer is then mixed with the hardening agent, and the mixture may be coated to form a layer as the magnetic recording medium, and more preferably, a liquid containing the prepolymer and a liquid containing the hardening agent is separately prepared, and both coating liquids may be simultaneously or separately coated on the foregoing base (e.g., the base can be a magnetic layer), and the coated layer is then hardened at room temperature or by heating. For the hardening, a glycerol borate is allowed to be added to the hardening agent liquid. The prepolymer-containing liquid may also contain a magnetic powdery material and various other additives. For the coating on a support it is desirable to prepare the prepolymer-containing liquid and the hardening agent-containing liquid separately to avoid possible occurrence of trouble (e.g., such a trouble that the hardening is too fast to make uniform coating; and the like).

The one-shot process is: An active hydrogen-containing compound, a glycerol borate, a catalyst, various additives, and the like, are mixed to prepare a resin liquid. The resin liquid is mixed with an organic isocyanate, and the mixture is then coated. Alternatively, both the resin liquid (may be diluted) and the isocyanate liquid (may be diluted) are prepared separately as in the preceding prepolymer process, and coated separately on a support and then hardened at room temperature or by heating.

Further, as the polyurethane resin of the present invention a monoliquid hardening-type polyurethane resin may be used. In this instance, an organic isocyanate is caused to react with an active hydrogen-containing compound and with, e.g., a glycerol borate, and the like, to thereby produce a prepolymer containing several % by weight of NCO radical. To this prepolymer is added, if necessary, various additives to thereby prepare a monoliquid hardening-type composition. The monoliquid hardening-type composition is then coated on a support (e.g., polyester base) or on a magnetic layer, and then the coated composition is allowed to stand at room temperature, during which it reacts with the moisture of air to be hardened to thereby become a layer containing the polyurethane of the present invention.

By comparison of the prepolymer process with the one-shot process, the prepolymer process is more desirable with respect to the coating condition.

The high-molecular compound of the present invention enables to obtain any desired various physical properties-having products ranging from low tensile modulus-having ones whose tensile stress in 100% elongation is from 5 to 250 kg/cm$^2$ and whose elongation at the time of break is from 100 to 1200% to high Young's modulus-having ones whose Young's modulus is from 10,000 to 30,000 kg/cm$^2$ and whose yield elongation is from 2 to 10%.

Synthesis examples of the novel high-molecular compound (polyurethane) for use in producing the magnetic recording medium of the present invention will be given below:

SYNTHESIS EXAMPLE 1

Two-hundred parts by weight of methyl-ethyl ketone, 40 parts by weight of a polyester polyol having molecular weight of about 1600 produced from ethylene glycol, 1,4-butylene glycol and adipic acid, 56 parts by weight of MDI (isocyanate), and 0.02 part by weight of dibutyl-tin dilaurate were put in a nitrogen gas-filled reaction chamber equipped with a stirrer and a reflux condenser to effect the reaction thereof for two hours at a temperature of 80° C. To the reaction mixture were added 64 parts by weight of a chain-elongating agent having a molecular weight of 355 obtained by the addition polymerization of propyleneoxide to bisphenol A and 100 parts by weight of methyl-ethyl ketone, and this mixture was subjected to another two-hour reaction at 80° C. To the thus obtained liquid were added 40 parts by weight of glycerol borate-oleate (Emulbon S-83, a product of Toho Chemical Industry Co., Ltd.), and the reaction of the mixture took place for one hour at 70° C. The resulting polyurethane resin solution contains 40% solid and has a viscosity of 2200 cps at 25° C. From this solution was evaporated the solvent to thereby obtain the resin having an yield stress of 235 kg/cm$^2$, an yield elongation of 2.2% and a Young's modulus of 13500 kg/cm$^2$.

The term "part(s)" in the following synthesis examples hereinafter represents part(s) by weight.

SYNTHESIS EXAMPLE 2

Fifty parts of a biuret reagent-modified polyisocyanate containing 23% isocyanate radical synthesized from hexamethylene diisocyanate and water and 50 parts of Cellosolve were mixed to prepare a liquid A.

On the other hand, 50 parts of a polyester polyol having a hydroxyl radical (OH) value of 300 mg KOH/g produced from trimethylol propane, phthalic acid and adipic acid were dissolved into 50 parts of Cellosolve acetate and to this were further added to mix therewith 0.02 part of dibutyl-tin dilaurate (catalyst) and 1 part of glycerol borate-monostearate (Emulbon S-60, a product of Toho Chemical Industry Co., Ltd.) to thereby prepare a liquid B.

Liquids A and B were mixed and the mixture was coated on a metallic plate (stainless steel) and then heated to 130° C. for 25 minutes for hardening.

The resulting polyurethane coat was of an yield stress of 355 kg/cm$^2$, an yield elongation of 2.6% and a Young's modulus of 19900 kg/cm$^2$.

SYNTHESIS EXAMPLE 3

Fifty parts of a diol (polyoxypropylene glycerol borate) having a molecular weight of 1000 obtained by the addition polymerization of 14 moles of propylene oxide to 1 mole of a glycerol borate and 15 parts of 2,4-tolylene diisocyanate were caused to react with each other in a nitrogen atmosphere for two hours at a temperature of 80° C. to thereby synthesize a prepolymer containing 4.5% isocyanate radical. 50 parts of the resulting polymer and 7 parts of methylene-bis(2-chloroaniline) were separately heated to 100° C. and then mixed with each other. Immediately after that the mixture was poured into a metal mold and allowed to stand for two hours in an atmosphere at 80° C. to be hardened to thereby produce an elastomer. The elastomer was then taken out of the metal mold and allowed to stand overnight. The physical characteristics (according to JIS K 6301) of the elastomer after that showed a hardness of (JIS-A) 90, a 100% modulus of 72 kg/cm$^2$, a tensile strength of 245 kg/cm$^2$, an elongation of 540%, and a repulsion elasticity of 40%. In the case of applying such a polyurethane resin as in, e.g., Synthesis Example 3 to a magnetic recording medium, it is desirable to prepare the magnetic layer of the magnetic recording medium by the foregoing prepolymer process or the one-shot process.

These compounds as the material for producing the boron-containing unit are of the prior art. Some of the compounds are generally commercially available, and the rest can be easily synthesized by methods of the prior art. These compounds as the material for the boron-containing unit may be used alone or in a mixture of not less than two thereof.

Further, these may be used in combination with other silane coupling agents, titanate coupling agents, phosphates, borates, amine compounds, and the like, for the magnetic recording medium of the present invention. Besides, the novel high-molecular compound of the present invention may be used also in combination with such resins as silicone-modified polyurethane, fluorinated urethane, polyesters, polyvinyl chloride, polyamides, epoxy, etc.; silicone oil, fatty acid esters, fatty acids, polyperchloroethylene, and the like.

The formation of a magnetic layer for the magnetic recording medium of the present invention is carried out in the manner that a ferromagnetic powdery material is formed as a thin layer on a support by such a method as vacuum deposition, spattering, ion plating or metal plating, or a ferromagnetic powdery material is kneaded together with a binder material and then dispersed into a solvent to prepare a magnetic coating liquid, and the magnetic coating liquid is then coated on a support to thereby produce a magnetic recording medium, the said ferromagnetic powdery material including various ferromagnetic powdery materials: such oxide ferromagnetic powdery materials as $\gamma$-Fe$_2$O$_3$, Co-containing $\gamma$-Fe$_2$O$_3$, Co-coated $\gamma$-Fe$_2$O$_3$, Fe$_3$O$_4$, Co-containing Fe$_3$O$_4$, CrO$_2$, etc.; and such metallic ferromagnetic powdery materials consisting principally of Fe, Ni, Co and Cr as Fe-Co-Ni alloy, Fe-Al alloy, MnBi, Fe-Al-P alloy, Fe-Co-Ni-Cr alloy, Fe-Ni-Zn alloy, Fe-Co-Ni-P alloy, Fe-Ni alloy, Co-Ni-P alloy, Co-Ni alloy, Co-P alloy, Fe-Mn-Zn alloy, Fe-Ni-Mn alloy, Fe-Ni-Cr-P alloy, Fe-Ni-Co-Zn alloy, etc.; and the like As the binder, along with the novel high-molecular compound containing the polymer segment having Formula (I) of the present invention, there may be used such compounds as vinyl chloride-vinyl acetate copolymers, vinyl chloride-vinylidene chloride copolymers, vinylidene chloride-acrylonitrile copolymers, butyl acrylate-acrylonitrile copolymers, collulose resins, epoxy resins, known polyurethane resins, and the like.

In providing a magnetic layer on a support, the layer may be provided either directly or through a subbing layer on the support. On one of or both the magnetic layer surface and the back of the support may be provided an overcoat layer and/or a backcoat layer, respectively, provided that at least one of these layers should be prepared by the incorporation thereinto of a novel high-molecular compound of the present invention containg a boron-containing unit.

Into the magnetic coating liquid of the present invention there may, if necessary, be incorporated such additives as dispersing agents, lubricants, abrasives, antistatic agents, and the like.

Methods for producing the magnetic coating liquid are detailed in Japanese Patent Examined Publication Nos. 15/1960, 26794/1964, 186/1968, 28043/1972, 28045/1972, 28046/1972, 31445/1972, 11162/1973, 21331/1973 and 33683/1973; and West German OLS Pat. No. 2,060,655.

As the binder applicable to the foregoing layers, in addition to the above novel high-molecular compound there may be used known thermoplastic resins, reaction-type resins or electron-beam-setting resins, or mixtures of these resins.

As the thermoplastic resin, those having a softening point of not more than 150° C., an average molecular weight of from 10,000 to 200,000, and a polymerization degree of from about 200 to about 2,000 may be used which include, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, acrylonitrile-butadiene copolymers, polyamide resins, polyvinyl butyral, cellulose derivatives (such as cellulose acetate-butyrate, cellulose diacetate, cellulose triacetate, cellulose propionate, nitrocellulose, etc.), styrene-butadiene copolymers, polyester resins, chlorovinyl ether-acrylate copolymers, amino resins, various synthetic rubber-type thermoplastic resins, and mixtures of these compounds.

These resins are as described in Japanese Patent Examined Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973; U.S. Pat. Nos. 3,144,352, 3,419,420, 3,499,789 and 3,713,887.

As the thermosetting resin or reaction-type resin, those whose molecular weight is not more than 200,000 in a coating liquid state and becomes infinite by the condensation or addition reaction after being coated and dried and those which are not softened nor fused until their thermal decomposition are desirable, examples of which include phenol resins, epoxy resins, polyurethane-setting-type resins, urea resins, melamine resins, alkyd resins, silicone resins, acryl-type reaction resins, a mixture of high-molecular polyester resins with isocyanate prepolymers, a mixture of methacrylate copolymers with diisocyanate prepolymers, a mixture of polyester polyols with polyisocyanates, urea formaldehyde resins, a mixture of low-molecular glycols with high-molecular diol prepolymers, a mixture of polyester polyols with polyisocyanates, a mixture of low-molecular glycols with high-molecular diols and triphenylmethane triisocyanates, polyamine resins, and mixtures of these resins.

These resins are as described in Japanese Patent Examined Publication Nos. 8103/1964, 9779/1965, 7192/1966, 8016/1966, 14275/1966, 18179/1967, 12081/1968, 28023/1969, 14501/1970, 24902/1970, 13103/1971, 22067/1972, 22072/1972, 22073/1972, 28045/1972, 38048/1972 and 28922/1972; and U.S. Pat. Nos. 3,144,353, 3,320,090, 3,437,510, 3,597,273, 3,781,210 and 3,781,211.

The electron-beam-setting resin includes such unsaturated prepolymers as, for example, maleic anhydride-type resins, urethane acryl-type resins, epoxyacryl-type resins, polyester acryl-type resins, polyether acryl-type resins, polyurethane acryl-type resins, polyamidoacryl-type resins, etc., and multifunctional monomers such as ether acryl-type resins, urethane acryl-type resins, epoxyacryl-type resins, phosphate acryltype resins, aryl-type resins, hydrocarbon-type resins, and the like.

These binder materials are used alone or in combination and, if necessary, may be used in combination with various additives.

Of those magnetic recording mediums of the present invention, in the coated-type magnetic recording medium the mixing proportion of the binder material to the ferromagnetic powdery material is used within the range of from 5 to 400 parts by weight, and preferably from 10 to 200 parts by weight to 100 parts by weight of the ferromagnetic powdery material.

If the binder is used in an excessive quantity, the recording density of the resulting magnetic recording medium becomes lowered, while if used in a too small quantity, then the strength of the magnetic layer becomes deteriorated, causing such undesirable effects as the reduction of its durability and blooming phenomenon.

Further, in order to improve the durability of the magnetic recording medium of the present invention the magnetic layer may contain a hardening agent for the binder; for example, a polyisocyanate, a polyamine, an epoxy compound, or the like, may be incorporated.

The polyisocyanate includes addition products of diisocyanates to trihydric polyols, pentamers of diisocyanates, and decarboxylated compounds from 3 moles of diisocyanates, and the like.

Examples of them include the addition product of 3 moles of tolylenediisocyanate to 1 mole of trimethylol propane, the addition product of 3 moles of methaxylylenediisocyanate to 1 mole of trimethylol propane, the pentamer of tolylenediisocyanate, the pentamer consisting of 3 moles of tolylenediisocyanate and 2 moles of hexamethylenediisocyanate, the decarboxylated product obtained by the reaction of 3 moles of hexamethylenediisocyanate with 1 mole of water, and the like, and these are readily obtainable industrially.

The dispersing agent for use in producing the magnetic recording medium of the present invention includes such fatty acids having from 8 to 18 carbon atoms (represented by R-COOH wherein R is a saturated or unsaturated alkyl radical having from 7 to 17 carbon atoms) as caprylic acid, capric acid, lauric acid, myristic acid, palmitic acid, stearic acid, oleic acid, elaidic acid, linolic acid, linolenic acid, etc.; metallic soaps comprised of those alkali-metallic (Li, Na, K, etc.) salts or alkaline-earth-metallic (Mg, Ca, Ba, etc.) salts of the above fatty acids; lecithin; and the like. In addition to these compounds higher alcohols having not less than 12 carbon atoms and sulfates can also be used. These dispersing agents may be used alone or in combination of not less than two thereof. These dispersing agents may be used within the range of from 1 to 20 parts by weight to 100 parts by weight of the ferromagnetic powdery material. These dispersing agents are as described in Japanese Patent Examined Publication Nos. 28369/1964, 17945/1969 and 15001/1973; and U.S. Pat. Nos. 3,587,993 and 3,470,021.

The lubricant applicable to the present invention includes silicone oil, carbon black, graphite, carbon black graft polymer, molybdenum disulfide, tungsten disulfide, such fatty acid esters consisting of a monobasic fatty acid having from 12 to 16 carbon atoms and a monohydric alcohol, said number of carbon atoms of said fatty acid plus the number of carbon atoms of said alcohol totalling to from 21 to 23 (the so-called wax). These lubricants are used within the range of from 0.2 to 20 parts by weight to 100 parts by weight of the ferromagnetic powdery material. These lubricants are as described in Japanese Patent Examined Publication Nos. 23889/1968 and 81543/1968; U.S. Pat. Nos. 3,470,021, 3,492,235, 3,497,411, 3,523,086, 3,625,760, 3,630,772, 3,634,253, 3,642,539 and 3,687,725; IBM Technical Disclosure Bulletin Vol. 9, No.7 Page 779 (Dec. 1966); and ELEKTRONIK 1961 No.12, Page 380, and the like.

As the abrasive usable in the present invention those generally used materials may be applied which include fused alumina, silicone carbide, chromium oxide, corundum, artificial corundum, diamond, garnet, emery (principal components: corundum and magnetite), and the like. These abrasives are used in an average particle size of from 0.05 to 5μ, and particularly preferably from 0.1 to 2μ. These abrasives are used within the adding quantity range of from 1 to 20 parts by weight to 100 parts by weight of the ferromagnetic powdery material. The abrasives are as described in Japanese Pat. O.P.I. Publication No. 115510/1974; U.S. Pat. Nos. 3,007,807, 3,041,196 and 3,687,725; British Pat. No. 1,145,349; and West German Pat. (DT-PS) No. 853,211.

The antistatic agent applicable to the present invention includes such dielectric powdery materials as graphite, carbon black, tin oxide-antimony oxide-type compounds, tin oxide-titanium oxide-antimony oxide-type compounds, carbon black graft polymers, etc.; such natural surfactants as saponin; nonionic surfactants such as alkylene oxide-type surfactants, glycerol-type surfactants, glycidol-type surfactants, etc.; cationic surfactants such as higher alkylamines, quaternary ammonium salts, pyridine or other heterocyclic compounds, phosphoniums or sulfoniums, etc.; anionic surfactants such as carboxylic acid, sulfonic acid, phosphoric acid, those containing such acid radicals as sulfuric acid ester radical, phosphoric acid ester radical, etc.; and amphoteric surfactants such as amino acids, aminosulfonic acids, sulfuric acid esters or phosphoric acid esters of aminoalcohol, etc.

These surfactants usable as the antistatic agent are as described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974; West German OLS Pat. No. 1,942,665; British Pat. Nos. 1,077,317 and 1,198,450; the "Kaimen-Kasseizai no Gōsei to sono Ōyo (Synthesis Methods and Applications of Surface Active Agents)" by Ryohei Oda (published by Maki Shoten 1964); the "Surface Active Agents" by A. W. Bailey (Interscience Publication, Inc. 1958); the "Encyclopedia of Surface Active Agents Vol. 2" by T. P. Sisley (Chemical Publishing Company, 1964); the "Kaimen-Kasseizai Benran (Handbook of Surface Active Agents)" 6th Ed., (Sangyo Tosho Kabushiki Kaisha, Dec. 20, 1966), and the like.

These surfactants may be used alone or in a mixture. These are used as the antistatic agent, but there are cases where they may be used for other purposes such as, e.g., for the improvement of dispersing or magnetic characteristics, for the improvement of lubricity, and for the application as a coating aid.

The solvent necessary for use in coating any of the foregoing layers of the magnetic recording medium of the present invention includes such ketone-type solvents as acetone, methyl-ethyl ketone, methyl-isobutyl ketone, cyclohexane, etc.; such alcohol type solvents as methanol, ethanol, propanol, butanol, etc.; such ester-type solvents as methyl acetate, ethyl acetate, butyl acetate, ethyl acetate, propyl acetate, etc.; such ether-type solvents as diethylene-glycol-dimethyl-2-ethoxyethanol, tetrahydrofuran, dioxane, etc.; such aromatic hydrocarbons as benzene, toluene, xylene, etc.; and such halogenated hydrocarbons as methylene chloride, ethylene chloride, carbon tetrachloride, chloroform, chlorobenzene, dichlorobenzene, etc.

Materials to be used as the support include such polyesters as polyethylene terephthalate, polyethylene-2,6-naphthalene, etc.; polyolefins such as polypropylene; such cellulose derivatives as cellulose triacetate, cellulose diacetate, etc.; such plastics as polycarbonate; such metals as Al, Zn, etc.; and various ceramics, and the like.

The thickness of the support, where it is film or a sheet, should be from about 3 to about 10 $\mu$m, and preferably from 5 to 50 $\mu$m, and, where it is a disc or card form, should be from about 30 $\mu$m to about 10 mm. And where a drum type is needed, the support should be in the cylindrical form, and its concrete configuration is to be determined according to the recorder used.

The above-described support, for purposes of antistatic treatment, antitransfer treatment, etc., may be provided on the opposite side thereof to the magnetic layer side with a backcoat layer, into which may be incorporated the novel highmolecular compound of the present invention.

Prior-art materials for the backcoat are as described in, e.g., U.S. Pat. Nos. 2,804,401, 3,293,066, 3,613,378, 3,062,676, 3,734,772, 3,476,596, 2,643,048, 2,803,556, 2,887,462, 2,923,642, 2,997,451, 3,007,892, 3,041,196, 3,115,420 and 3,166,688.

The support is allowed to be in any form such as tape, sheet, card, disk, drum, or the like, and various materials should be selected to be used in accordance with the form of the support used.

In the magnetic recording medium of the present invention, in the case of the coating type, ferromagnetic powdery material-dispersed liquid and binder material, dispersing agent, lubricant, abrasive, antistatic agent, solvent, and the like, are kneaded to thereby prepare a magnetic coating liquid.

In the kneading, the above ferromagnetic powdery material-dispersed liquid and the other components are all simultaneously or sequentially put in a kneader. For example, firstly to a dispersing agent-containing solution is added the foregoing ferromagnetic powdery material, and the mixture is kneaded for a given period of time, and after that the other components are added to the mixture to continue further kneading, thereby preparing a magnetic coating material.

For the kneading and dispersion various kneaders are usable which include, e.g., two-roll mills, 3-roll mills, ball mills, pebble mills, sand grinders, Szegvari Attriter, high-speed impeller dispersers, high-speed stone mills, high-speed impact mills, disperkneaders, high-speed mixers, homogenizers, ultrasonic dispersers, and the like.

Techniques for the kneading and dispersion are detailed in T. O. Patton "Paint Flow and Pigment Dispersion" (published by John Willey & Sons, 1964) and also in U.S. Pat. Nos. 2,581,414 and 2,855,156.

The coating of the above magnetic coating material for the formation of the foregoing magnetic layer on a support may be carried out by any one of such coating processes as gravure roll coating, wire bar coating, doctor blade coating, reverse roll coating, dip coating, air knife coating, calender coating, squeeze coating, kiss coating, fountain coating, and equivalent others. These coating processes are detailed in the "Kōingu Kogaku (Coating Technology)" (published by Asakura Shoten, 1971).

The magnetic layer coated by such a method on a support is, if necessary, subjected to a treatment for the orientation of the ferromagnetic powdery material, and then dried. The coated material, also if necessary, is subjected to a surface-smoothing treatment or cut into a desired form to thereby produce a magnetic recording medium of the present invention.

In this instance, it is desirable that the orientation magnetic field be AC or DC about 500 to about 3500 gauss, the drying temperature be from about 50° C. to about 100° C., and the drying time be from about 3 to about 10 minutes.

The orientation of the ferromagnetic powdery material of the present invention may be carried out in any of the manners as described in, e.g., U.S. Pat. Nos. 1,949,840, 2,796,359, 3,001,891, 3,172,776, 3,416,949, 3,473,960, 3,681,138; Japanese Pat. Examined Publication Nos.3427/1957, 28368/1964, 23624/1965, 23625/1965, 13181/1966, 13043/1973 and 39722/1973.

FUNCTION OF THE INVENTION

In a magnetic recording medium comprising a support having thereon at least one ferromagnetic powdery material-containing magnetic layer (the magnetic layer being allowed to comprise not less than two layers which may be on one side of or both sides of the support), the medium contains a binder having a boron-containing unit having Formula (I) in at least one of the inside of, the underneath of and the overcoat on the magnetic layer, and the backcoat layer of the support, so that any possible blooming effect; i.e., the low-molecular additives-oozing out phenomenon, can be prevented to thereby improve the lubricity and wear resistance of the magnetic recording medium. Further, in the case where the invention's novel high-molecular compound-containing layer is the topmost layer of the magnetic recording medium, the medium, when running being rubbed by a magnetic head or other means, shows satisfactory results in its running stability, wear resistance, lubricity, and the like, that have never been recognized before, and the excellent output, S/N ratio, etc., of the medium considered due to the above, have been obtained in a stable condition over an extensive period of time.

EXAMPLES

Examples of the present invention will be illustrated below by comparison with comparative examples.

The term "part(s)" used hereinafter in the following examples and comparative examples means part(s) by weight. The terms "video tape," "audio tape," "floppy disk," and the like, are all included in the idea of the term "magnetic recording medium."

EXAMPLE 1

(1) MAGNETIC COATING MATERIAL

The composition components given in the first column of Table 1 were mixed in the proportion as given in the second column of the same table, and further mixed and dispersed by a ball mill, and to this were then added 5 parts of a polyisocyanate solution ("Coronate L", a product of Nippon Polyurethane, K.K.) to be mixed uniformly, whereby a magnetic coating material Z-1 was prepared.

TABLE 1

| Composition | Mixing ratio (parts) |
| --- | --- |
| Co-coated $\gamma$-Fe$_2$O$_3$ | 65 parts |
| Partially hydrolyzed vinyl chloride-vinyl acetate copolymer ("VACH", a product of Union Carbide) | 2 parts |
| Boron-containing unit-having urethane resin (produced by Synthesis Example) | 7 parts |
| Polyurethane ("Estane 5701", a product of Goodrich) | 7 parts |
| Lecithin | 2 parts |
| Methyl-ethyl ketone (hereinafter called MEK) | 50 parts |
| Toluene | 45 parts |
| Cyclohexanone | 110 parts |

(2) Tape

The magnetic coating material Z-1 obtained in the above process (1) was coated with applying a magnetic field of 2000 gauss thereto on one side of a 12$\mu$-thick polyethylene terephthalate film support so that the dry thickness becomes 5$\mu$.

The thus obtained web sample was supercalendered and then slitted into 12.65 mm-wide rolls to thereby produce a video tape sample, which was regarded as Tape 1.

EXAMPLES 2-5

The composition components given in the first column of Table 2 were mixed in the proportions as given in the sub-columns of the second column in the same table, and the obtained compositions were subjected to the same treatment as in Example 1 to thereby prepare coating materials Z-2, -3, -4 and -5.

The obtained magnetic coating materials Z-2, -3, -4 and -5 were coated on separately prepared 12$\mu$-thick polyethylene terephthalate film supports, respectively, with the same treatment as in process (2) of Example 1 to thereby prepare 12.65 mm-wide video tape rolls, which were then regarded as Tapes-2, -3, -4 and -5, respectively.

TABLE 2

| Composition | Mixing proportion | | | | |
| --- | --- | --- | --- | --- | --- |
| Co-coated $\gamma$-Fe$_2$O$_3$ | 65 parts | 65 parts | 65 parts | 65 parts | 65 parts |
| VAGH | — | — | 3 parts | — | 2 parts |
| Nitrocellulose ($\frac{1}{2}$ sec.) | — | — | 3 parts | — | — |
| Vylon -200 (polyester, a product of Toyo Spinning Co., Ltd.) | — | 2 parts | — | — | — |
| Polyurethane resin of the invention (Synthesis Example 1) | 7 parts | 7 parts | 4 parts | 7 parts | — |
| Estane 5701 | 7 parts | 7 parts | 6 parts | 7 parts | 14 parts |
| PKHH (phenoxylene, a product of Union Carbide) | — | — | — | 2 parts | — |
| Lecithin | 2 parts | 2 parts | 2 parts | 2 parts | 2 parts |
| Methyl-ethyl ketone | 50 parts | 50 parts | 50 parts | 50 parts | 50 parts |
| Toluene | 45 parts | 45 parts | 45 parts | 45 parts | 45 parts |
| Cyclohexanone | 110 parts | 110 parts | 110 parts | 110 parts | 110 parts |
| Obtained magnetic coating material No. | Z-2 | Z-3 | Z-4 | Z-5 | Control-1 |

COMPARATIVE EXAMPLE 1

The composition components given in the first column of Table 2 were mixed in the proportion as given in the column "Control-1" of the second column of the same table to thereby prepare a comparative magnetic coating material, which was then treated in the same manner as in process (2) of Example 1, whereby a 12.65 mm-wide video tape sample Comparative Tape 1.

The characteristics of Tapes 1-5 and Comparative Tape 1 thus obtained from Examples 1-5 and Comparative Example 1 were examined, and the obtained results are shown in Table 3. The examined characteristics of these tapes include the deterioration of RF output after 100-time tape runs, skew value, and coefficient of kinetic friction.

(a) Deterioration of RF output: After 100-time tape runs, the RF output in 4 MHz was shown on the basis of the original output (before the tape run) by use of a RF output testing VTR deck.

(b) Skew: The degree of time lag at the time of picture reproduction after 100-time tape runs was shown with how much it lags behind the reference signal (63.5-microsecond signal required for scanning over a CRT screen from one end to the other end thereof).

(c) Coefficient of kinetic friction: After each tape was allowed to stand for 24 hours under an atmospheric condition of a temperature of 25° C. with a relative humidity of 55%, to the tape was applied a 100 g load by hanging it from one end thereof and the tape was made at a standstill. The test was made by bringing a rotary roller revolving at the circumferential speed of 6 meters per second into contact with the tape.

TABLE 3

| Sample No. | Output deterioration (dB) | Skew value (after 100-time tape runs) | Coefficient of kinetic friction |
|---|---|---|---|
| Tape 1 | −1.1 | 1.5 | 0.35 |
| Tape 2 | −1.2 | 1.5 | 0.33 |
| Tape 3 | −1.0 | 2.0 | 0.33 |
| Tape 4 | −1.3 | 1.5 | 0.29 |
| Tape 5 | −1.1 | 2.0 | 0.31 |
| Control tape 1 | −2.5 | 3.0 | 0.65 |

From Table 3 it is understood that the video tape samples containing the binder of the present invention in the magnetic layer thereof are much excellent in the degree of the deterioration of the output, skew value, and coefficient of kinetic friction as compared to the sample not containing the binder of the present invention.

EXAMPLES 6–7

A Co-Ni alloy powder was evaporated under vacuum by electron-beam heating to thereby deposit a Co-Ni alloy layer on a polyethylene terephthalate sheet. After that the sheet was divided into two, on the Co-Ni alloy layer of one of which was then coated a solution prepared by mixing the components given in the first column of Table 4 in the proportion as given in the column "Example 6" in the second column of the same table, and on the same layer of the other of which was coated another solution prepared by mixing the same components in the proportion as given in the column "Example 7" in the same table, and the thus obtained web samples were slitted into 12.65 mm-wide video tapes, which were regarded as Tapes 6 and 7, respectively.

COMPARATIVE EXAMPLES 2–4

In the same manner as in Examples 6–7, a Co-Ni alloy powder was evaporated by electron-beam heating to be deposited to form a Co-Ni alloy layer on a polyethylene terephthalate sheet in a vacuum chamber, and the sheet was divided into three, on which were coated separately by a reverse roll coater three different solutions prepared by mixing the composition components given in the first column of Table 4 in the mixing proportions as given in the columns "Control examples -2, -3 and -4" of the same table, and after that the obtained web samples were slitted into 12.65 mm-wide video tapes, which were regarded as Control tapes-2, -3 and -4, respectively.

TABLE 4

| Composition | Example 6 | Example 7 | Control ex. 2 | Control ex. 3 | Control ex. 4 |
|---|---|---|---|---|---|
| Urethane resin of invention (Composition ex. 2 in Table 9) | 1 | — | — | — | — |
| Urethane resin of invention (Composition ex. 4 in Table 9) | — | 1 | — | — | — |
| Vinyl chloride-vinyl acetate copolymer (VAGH) | — | — | 1 | — | — |
| Toluene/methyl-ethyl ketone/cyclohexane = 20/60/20 | 100 | 100 | 100 | 100 | 100 |
| Glycerol borate-oleate ("Emulbon S-80" by Toho Chem. Ind. Co.) | — | — | — | 0.01 | — |
| Polycyclohexane-type lubricant (silicone oil) | — | — | — | — | 0.2 |
| "Coronate L" | 0.1 | 0.1 | — | — | — |

The Tapes 6–7 and Control Tapes 2–4 thus obtained in Examples 6–7 and Comparative Examples 2–4 were examined with respect to their characteristics. The obtained results are as given in Table 5.

TABLE 5

| Sample No. | Output deterioration | Skew value (after 100-time tape runs) | Coefficient of kinetic friction |
|---|---|---|---|
| Tape 6 | −1.8 | 1.0 | 0.26 |
| Tape 7 | −1.9 | 1.0 | 0.27 |
| Control tape 2 | −6.5 | 4.0 | 0.35 |
| Control tape 3 | −2.2 | 2.5 | 0.29 |
| Control tape 4 | −5.0 | 3.0 | 0.32 |

The output deterioration, skew value and coefficient of kinetic friction were determined in the same manner as in the case of Table 3.

From the results as given in Table 5 it is apparent that the video tapes containing in their overcoat layers the binder of the present invention are much excellent in the degree of the output deterioration, skew value and coefficient of kinetic friction as compared to the control tapes not containing the binder of the invention.

EXAMPLES 8–12

(1) Backcoat layer

Six rolls of 15μ-thick polyethylene terephthalate film were prepared, which were coated separately on the back thereof with compositions obtained by mixing and dispersing the composition components given in the first column of Table 6 in the mixing proportions as given in Examples 8–12 and Control Example 5 in the second, third, fourth, fifth and seventh columns, respectively, of the same table, whereby six individual backcoat layers were formed.

TABLE 6

| Composition | Example 8 | Example 9 | Example 10 | Example 11 | Example 12 | Control ex. 5 |
|---|---|---|---|---|---|---|
| Nippolan N-2304 (urethane resin, by Nippon Urethane) | — | — | — | — | — | 3 |
| Urethane resin of inven- | — | 3 | — | — | — | — |

TABLE 6-continued

| Composition | Example 8 | Example 9 | Example 10 | Example 11 | Example 12 | Control ex. 5 |
|---|---|---|---|---|---|---|
| tion (composition ex. 3 of Table 9) | | | | | | |
| Urethane resin of invention (composition ex. 5 of Table 9) | — | — | 3 | — | 2.5 | — |
| Uretnane resin of invention (composition ex. 6 of Table 9) | — | — | — | 3 | — | — |
| Urethane resin of invention (composition ex. 7 of Table 9) | 3 | — | — | — | — | — |
| Nitrocellulose (½ sec.) | — | — | — | — | 0.5 | — |
| Methyl-ethyl ketone | 50 | 50 | 50 | 50 | 50 | 50 |
| Methyl-isobutyl ketone | 50 | 50 | 50 | 50 | 50 | 50 |
| Coronate 3041 (polyisocyanate, by Nippon Polyurethane) | 0.3 | 0.3 | 0.3 | 0.3 | 0.3 | 0.3 |

(2) Magnetic layer

A magnetic coating material was prepared in the manner that the composition components given in the first column of Table 7 were mixed in the mixing proportion as given in the second column of the same table and sufficiently mixed to be dispersed by a ball mill, and to the dispersed liquid were added 5 parts of Coronate L (polyisocyanate manufactured by Nippon Polyurethane K.K.: an ethyl acetate solution containing 75% by weight of the addition product of 1 mole of trimethylol propane and 3 moles of tolylenediisocyanate) and mixed uniformly.

TABLE 7

| Composition | Mixing ratio |
|---|---|
| Co-containing γ-Fe$_2$O$_3$ | 60 parts |
| VAGH | 4 parts |
| Crisvon 4216 (urethane resin, a product of Dainippon Ink Chemical Co.) | 16 parts |
| Lecithin | 2 parts |
| MEK | 80 parts |
| Toluene | 80 parts |
| THF (tetrahydrofuran) | 80 parts |

The thus prepared magnetic coating material was coated with applying a magnetic field of 2000 gauss to the opposite side to the backcoat layer side of each of the process (1)completed samples of Examples 8-12 so that the dry thickness becomes 5μ. Each of the thus obtained samples was slitted into 12.65 mm-wide video tape, thus preparing Tapes 8, 9, 10, 11 and 12 and Control Tape 5.

The tape samples each was examined with respect to the coefficient of kinetic friction and chroma noise. The chroma noise is expressed in the proportion of an effective value of the chroma signal alone taken out in reproducing a picture recorded by converting a chroma signal of 3.58 MHz into a luminance signal of 0.714Vp-p to the noise level free of the chroma signal.

TABLE 8

| Sample No. | Coefficient of kinetic friction | Chroma noise |
|---|---|---|
| Tape 8 | 0.30 | +3.1 |
| Tape 9 | 0.32 | +2.6 |
| Tape 10 | 0.31 | +2.5 |
| Tape 11 | 0.31 | +2.7 |

TABLE 8-continued

| Sample No. | Coefficient of kinetic friction | Chroma noise |
|---|---|---|
| Tape 12 | 0.31 | +2.6 |
| Control tape | 0.62 | 0 |

From the results shown in Table 8 it is understood that the tapes containing in the backcoat layer thereof the binder of the present invention are excellent in their running stability as well as in the video characteristics.

EXAMPLES 13-14

On a polyethylene terephthalate support was coated the composition given in the column "Example 6" in the second column of Table 4 and then dried as subbing layer, and on this was further coated the composition given in Table 4 in the same manner as in Example 8 and then dried, thereby preparing Tape 13.

On the other hand, on another polyethylene terephthalate support was coated and then dried the composition as given in Table 1 in the same manner as in Example 1 to thereby prepare Tape 14.

Further, for comparison, on another polyethylene terephthalate support was coated directly and then dried the composition as given in Table 7 in the same manner as in Example 8 to thereby prepare a control tape.

These three different tape samples were compared with one another with respect to the magnetic layer adherence to the support by peeling operation with use of a commercially available adhesive tape. As a result, Tape 13 showed that the magnetic layer remains a little on the support (indicated with marking ○), Tape 14 showed a considerable remaining part of the magnetic layer on the support (marking ⊙), and the control tape showed little or no magnetic layer remaining (marking X), provided that the judgement of whether the result is ○, ⊙ or X was made in the manner that when a 12 mm-wide adhesive tape "Cellotape" (Trade name) of Nichiban Co., Ltd., was applied onto and peeled apart from the surface of the magnetic layer of the magnetic recording medium, the amount of the magnetic layer adhering to the adhesive tape was judged by the eye.

The characteristics given in Tables 3, 4 and 8 were not merely of the video tape but also obtained in the case of the audio tape, floppy disk, and other equivalent magnetic recording mediums.

Further, the results obtained by tests made with respect to coefficient kinetic friction in order to examine the lubricity of the urethane resins having boron-containing unit having Formula (I) of the present invention are as indicated in Table 9.

In Table 9, the mixing proportions of the composition examples given in the first colum for the polyurethane resin compositions are as indicated in the second, third, and fourth colums of the table.

In Table 9, these urethane resins in the composition examples 2-7 and comparative composition example were prepared by treating the composition components given in the first column in the same manner as in the foregoing Synthesis Example 1.

Figure 5:
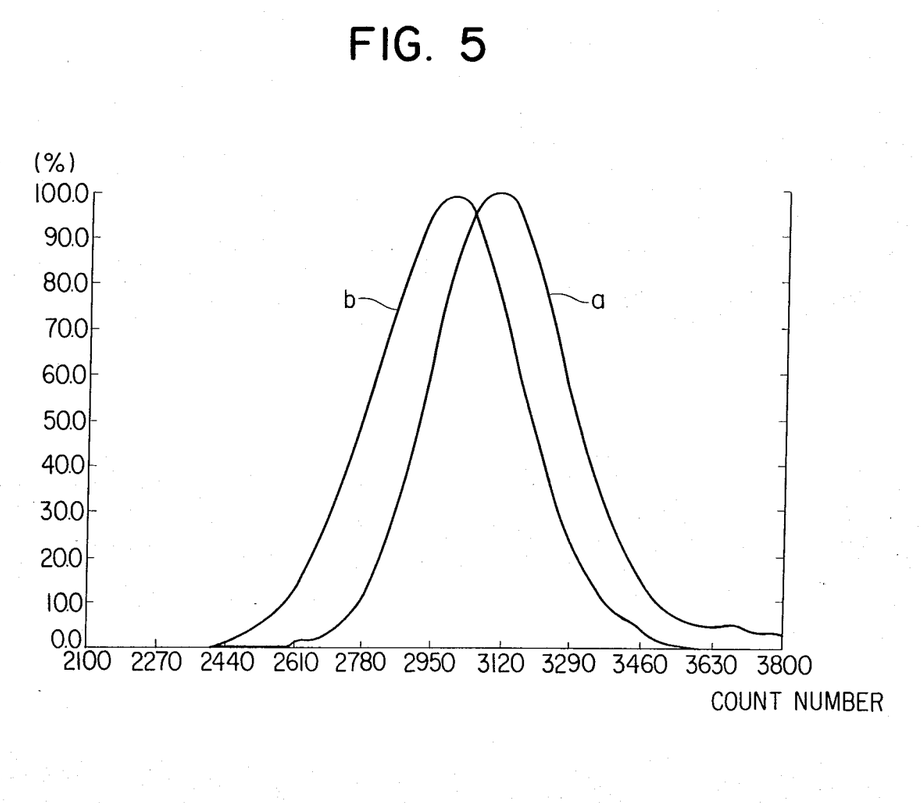
FIG. 5 is a schematic chart showing the GPC curves of the high-molecular compound used in the magnetic recording medium of the present invention and of the high-molecular compound used in a prior-art magnetic recording medium.

The thus obtained urethane resins in the synthesis examples and comparative synthesis example were each dispersed into a mixture solvents methyl-ethyl ketone/cyclohexanone (7/3), and the dispersed liquid was coated on a polyethylene terephthalate film support so that the thickness thereof becomes 10μ, and the resulting samples were tested with respect to the coefficient of kinetic friction.

ing novel resin, its characteristic curve of GPC (Gel Permeation Chromatography) were measured. FIG. 5 is a chart showing such curves, wherein the axis of ordinate represents strength (the strength in the maximum peak is standardized to 100%), and the axis of obscissa represents count number. And curve a is the GPC curve of the high-molecular compound obtained in Composition Example 1, and curve b is the GPC curve of the high-molecular compound of Comparative Synthesis Example, provided that the measurements of the GPC curves took place under the following conditions:

The measuring instrument used: HLC-802uR (trade name) (manufactured by Toyo Soda Mfg. Co., Ltd.)
Gel: YSK-GELH type (polyethylene) 7.5 mmφ 600 mm long ×2
Elution: tetrahydrofuran
Flow: 1.2 ml/min.
Pressure: 20 kg/cm$^2$ That the novel high-molecular compound shown with curve a in the GPC chart contains boron was ascertained by the emission spectrochemical analysis.

EFFECT OF THE INVENTION

The thus prepared magnetic recording medium of the

TABLE 9

| Composition Ex. | Active halogen compound | | Isocyanate | Material compound for boron-containing unit | Coefficient of kinetic friction of layer |
|---|---|---|---|---|---|
| 1 | Polyester polyol(average molecular weight 1600) 80 parts | Polypropylene addition product of bisphenol A(average molecular weight 335) 127.5 parts | MDI 112.5 parts | Glycerol borate-oleate Emulbon S-83 (Toho Chem. Ind. Co.) 80 parts | 0.41 |
| 2 | Polyester polyol(average molecular weight 1600) 80 parts | Neopentyl glycol 37.4 parts | TDI 78.3 parts | Glycerol borate-oleate Emulbon S-83 (Toho Chem. Ind. Co.) 80 parts | 0.43 |
| 3 | Polyether polyol(average molecular weight 1011)50.6 parts | Polypropylene addition product of bisphenol A(average molecular weight 335) 127.5 parts | TDI 78.3 parts | Glycerol borate-oleate Emulbon S-83 (Toho Chem. Ind. Co.) 70 parts | 0.45 |
| 4 | Polyether polyol(average molecular weight 2036)81.5 parts | Neopentyl glycol 38.5 parts | MDI 115 parts | Glycerol borate-stearate Emulbon S-66 (Toho Chem. Ind. Co.) 80 parts | 0.41 |
| 5 | Polyether polyol(average molecular weight 1011)50.6 parts | Polypropylene addition product of bisphenol A(average molecular weight 335) 127.5 parts | HXDI 87.3 parts | Glycerol borate-stearate Emulbon-S-66 (Toho Chem. Ind. Co.) 70 parts | 0.43 |
| 6 | Polylactone polyol(average molecular weight 1700) 85 parts | 1,4-butanediol 32.5 parts | MDI 112.5 parts | Glycerol borate-stearate Emulbon S-66 (Toho Chem. Ind. Co.) 80 parts | 0.45 |
| 7 | Polylactone polyol(average molecular weight 1700) 85 parts | Neopentyl glycol 37.5 parts | TDI 78.3 parts | Glycerol borate-stearate Emulbon S-66 (Toho Chem. Ind. Co.) 80 parts | 0.41 |
| Comparative synthesis example | Polyester polyol(average molecular weight 1600) 80 parts | Neopentyl glycol 37.4 parts | MDI 112.5 parts | Isopropanol 5 parts | 0.83 |

Measurements for the coefficient of kinetic friction were made under the same condition as in the case of Table 3.

From the results shown in Table 9 it is obvious that the samples containing these high-molecular compounds of the present invention (polyurethane resins) show that their coefficient of kinetic friction is only about one second of that of the sample containing the prior-art polyurethane synthesized by use of isopropanol.

Further, in order to ascertain that the high-molecular compound of the present invention is a boron-containpresent invention is excellent in the lubricity as well as in the wear resistance as compared to those of the prior art, thus enabling to obtain a magnetic recording medium having a high reproducing output and excellent in the wear resistance as well as in the skew value.

What is claimed is:

1. In a magnetic recording medium comprising a support having thereon a magnetic layer containing a ferromagnetic powdery material,
said magnetic recording medium comprising at least one layer containing a high-molecular compound having a boron-containing unit having the formula (I):

Formula (I)

wherein at least one of $x^1$, $x^2$, $x^3$ and $x^4$ has through an oxygen atom a linkage "-O—R-" with a polymer chain, and R is a divalent substituted or unsubstituted hydrocarbon residue.

2. The magnetic recording medium of claim 1, wherein said boron-containing unit is produced from a compound having the following Formula (II) or Formula (III):

Formula (II)

Formula (III)

in Formula (II) and Formula (III) R is an alkylene radical having from 2 to 4 carbon atoms, x is a hydrogen atom or an acyl radical having from 8 to 22 carbon atoms, and l and m each is an integer of from 0 to 20.

3. The magnetic recording medium of claim 2, wherein the addition number of alkyleneoxide (l+m) in said Formula (II) is from 0 to 30.

4. The magnetic recording medium of claim 1, wherein said high-molecular compound having said boron-containing unit is a polyurethane formed by the reaction of a glycerol borate having said Formula (II) or (III) with an organic isocyanate.

5. The magnetic recording medium of claim 2, wherein said glycerol borate having said Formula (II) or (III) is used in the quantity range of from 5% by weight to the quantity equal to that of an active hydrogen-containing compound unit for producing said polyurethane.

6. The magnetic recording medium of claim 4, wherein said organic polyisocyanate is used in a quantity corresponding to the isocyanate radical contained therein which is in a equivalent ratio of 0.85-1.1 to the total active hydrogen content of said active hydrogen compound and of said glycerol borate.

7. The magnetic recording medium of claim 4, wherein said polyurethane is a two-liquid hardening-type polyurethane resin which is comprised of a prepolymer produced by the reaction by heating to a temperature of from 60° C. to 100° C. for several hours of said organic isocyanate with part of said active hydrogen compound and with said glycerol borate in the presence of or absent from a catalyst and a hardening agent prepared by mixing the remainder of said active hydrogen compound with, if necessary, various additives.

8. The magnetic recording medium of claim 7, wherein said prepolymer and said hardening agent are separately prepared in the liquid form and coated separately on a support.

9. The magnetic recording medium of claim 1, wherein said ferromagnetic powdery material is used with a binder material in a mixing proportion of from 10 to 200 parts by weight of said binder material to 100 parts by weight of said ferromagnetic powdery material.

10. The magnetic recording medium of claim 1, wherein said magnetic recording medium uses an abrasive whose mean particle size is from 0.1 to $2\mu$.

11. The magnetic recording medium of claim 1, wherein said support, if it is in the film or sheet form, is from 5 to $5\mu$ thick, and, if it is in the card form, is from 30 $\mu m$ to 10 mm thick.

12. The magnetic recording medium of claim 1, wherein said ferromagnetic powdery material is subjected to an orientation magnetic field of AC or DC about 500 to 3500 gauss, and dried at a temperature of from about 50° to 100° C. for a period of from about 3 to 10 minutes for the formation of said magnetic layer on said support.

* * * * *